(12) United States Patent
Chandra et al.

(10) Patent No.: US 10,012,999 B2
(45) Date of Patent: Jul. 3, 2018

(54) EXPLOITING OR AVOIDING AIR DRAG FOR AN AERIAL VEHICLE

(71) Applicant: Microsoft Technology Licensing, LLC, Redmond, WA (US)

(72) Inventors: Ranveer Chandra, Kirkland, WA (US); Ashish Kapoor, Kirkland, WA (US); Jongho Won, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 14/991,846

(22) Filed: Jan. 8, 2016

(65) Prior Publication Data

US 2017/0199527 A1 Jul. 13, 2017

(51) Int. Cl.
*G05D 1/08* (2006.01)
*G05D 1/02* (2006.01)
(Continued)

(52) U.S. Cl.
CPC ......... *G05D 1/0808* (2013.01); *B64C 39/024* (2013.01); *G05D 1/0011* (2013.01);
(Continued)

(58) Field of Classification Search
None
See application file for complete search history.

(56) References Cited

U.S. PATENT DOCUMENTS 8,905,358 B2 12/2014 Abershitz
9,127,908 B2 9/2015 Miralles
(Continued)

FOREIGN PATENT DOCUMENTS

WO 2014209220 A1 12/2014
WO 2015150470 A1 10/2015

OTHER PUBLICATIONS

Kamran Tukoglu,"Real-Time Second Order Optimal Guidance Strategies for Optimizing Aircraft Performance in Stochastic Wind Conditions", apxiv.org, Cornell University Library, 201 Olin Library Cornell University Ithaca, NY 14845, Jan. 29, 2015 (Jan. 29, 2015), xp080675688.
(Continued)

*Primary Examiner* — Lail A Kleinman
(74) *Attorney, Agent, or Firm* — Fountainhead Law Group P.C.

(57) ABSTRACT

Methods and apparatus for avoiding or exploiting air drag on an aerial vehicle are disclosed. In embodiments, the methods and apparatus may be implemented in a controller and used to increase the energy efficiency of an aerial vehicle. In the embodiments, at least one parameter associated with a force on an aerial vehicle is determined. A yaw setting for the aerial vehicle is then determined that exploits or avoids air drag on the aerial vehicle for energy efficiency. The yaw setting may be referenced to a yaw based on directionality in the shape of the aerial vehicle. In other embodiments, a drag associated with a force on an aerial vehicle is determined. It is then determined if there is a selected component in the drag based on a desired maneuver of the aerial vehicle. A yaw setting is then determined based on whether the selected component is in the drag.

20 Claims, 8 Drawing Sheets

(51) Int. Cl.
B64C 39/02 (2006.01)
G05D 1/00 (2006.01)
B64C 27/00 (2006.01)

(52) U.S. Cl.
CPC ............. *G05D 1/0204* (2013.01); *G05D 1/08* (2013.01); *B64C 27/00* (2013.01); *B64C 2201/027* (2013.01); *B64C 2201/108* (2013.01); *B64C 2201/127* (2013.01); *B64C 2201/14* (2013.01); *B64C 2201/141* (2013.01); *B64C 2201/146* (2013.01)

(56) References Cited

U.S. PATENT DOCUMENTS

| | | | |
|---|---|---|---|
| 9,878,786 B2* | 1/2018 | Chan | B64C 39/024 |
| 2003/0034421 A1 | 2/2003 | Clark | |
| 2011/0295569 A1* | 12/2011 | Hamke | G01P 7/00 703/2 |
| 2012/0209455 A1 | 8/2012 | Warkomski | |
| 2012/0209456 A1 | 8/2012 | Harmon et al. | |
| 2013/0006448 A1 | 1/2013 | Callou et al. | |
| 2013/0175404 A1 | 7/2013 | Shefer | |
| 2014/0129057 A1 | 5/2014 | Hall et al. | |
| 2015/0057844 A1* | 2/2015 | Callou | G05D 1/0204 701/3 |
| 2015/0076289 A1* | 3/2015 | Chubb | B64C 39/022 244/76 R |
| 2015/0259066 A1 | 9/2015 | Johannesson et al. | |
| 2015/0331420 A1* | 11/2015 | Chubb | B64C 39/022 701/7 |
| 2016/0179097 A1* | 6/2016 | Chua | B64C 25/32 701/2 |

OTHER PUBLICATIONS

"International Search Report and Written Opinion Issued in PCT Application No. PCT/US2016/068611", dated Mar. 14, 2017, 16 Pages.

Merrett, Rebecca, "Airflow prediction to make more energy efficient drones", Published on: Apr. 7, 2014 Available at: http://www.computerworld.com.au/article/542252/airflow_prediction_make_more_energy_efficient_drones/.

Lutus, Paul, "A Virtual Bird", Published on: Mar. 7, 2015 Available at: http://www.arachnoid.com/drones/index.html#Quadcopter_Videos.

Jain, Abhishek, "Quadcopter for Robotic Applications: A Review", Published on: Mar. 2, 2014 Available at: http://diydrones.com/profiles/blogs/quadcopter-a-review.

Smith, Korey, "Best Drones for Sale and Why", Published on: Oct. 1, 2015 Available at: http://myfirstdrone.com/tutorials/buying-guides/best-drones-for-sale/.

Mancuso, et al., "A Low-Power Architecture for High Frequency Sensor Acquisition in Many-DOF UAVs", In Proceedings of ACM/IEEE 5th International Conference on Cyber-Physical Systems, Apr. 14, 2014, pp. 103-114.

Moyano Cano, Javier, "Quadrotor UAV for wind profile characterization", Retrieved on: Oct. 9, 2015 Available at: http://e-archivo.uc3m.es/bitstream/handle/10016/18105/PFC_Javier_Moyano_Cano_pdf?sequence=1.

"Second Written Opinion Issued in PCT Application No. PCT/US2016/068611", dated Dec. 14, 2017, 8 Pages.

* cited by examiner

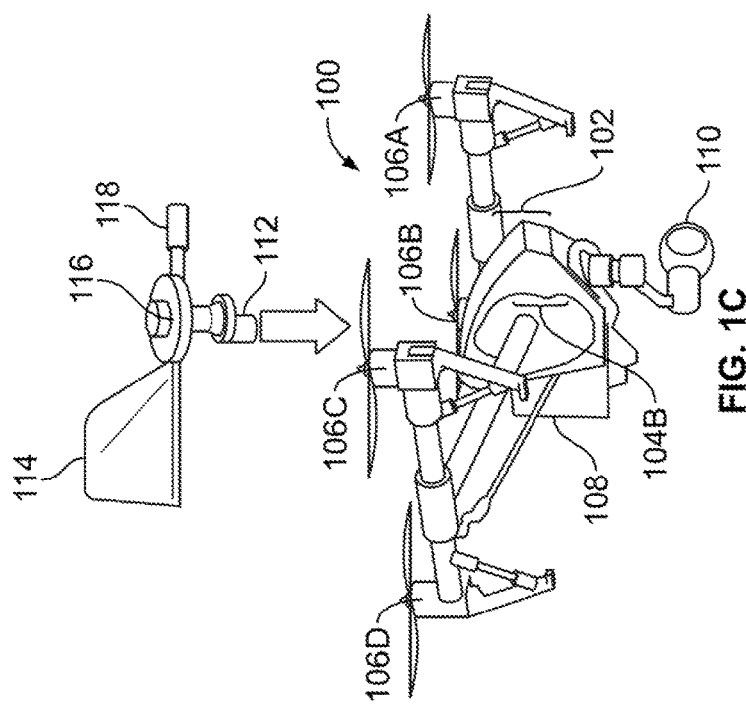
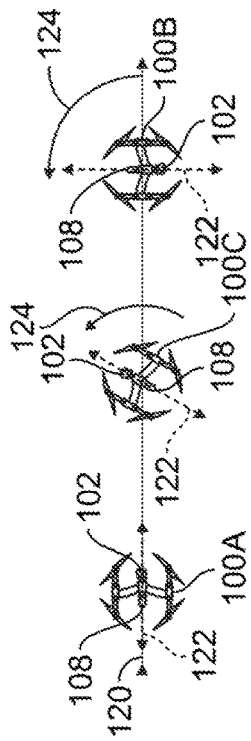
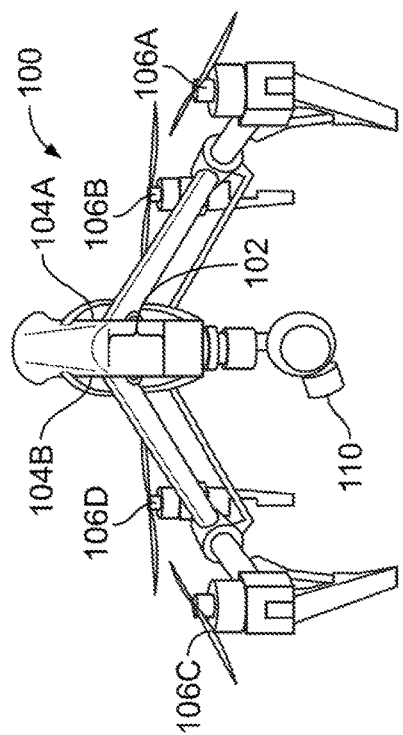
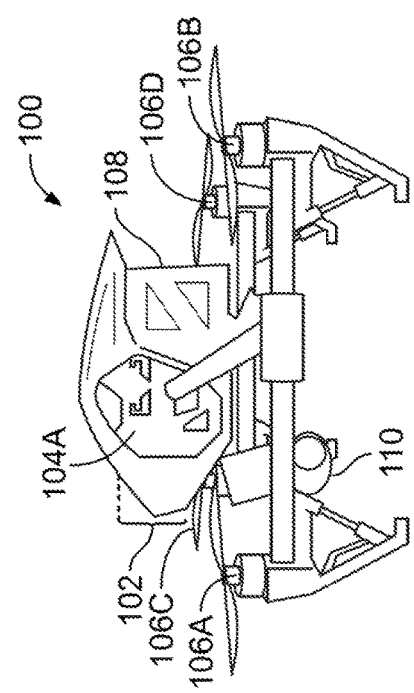
FIG. 1A
FIG. 1B
FIG. 1C
FIG. 1D

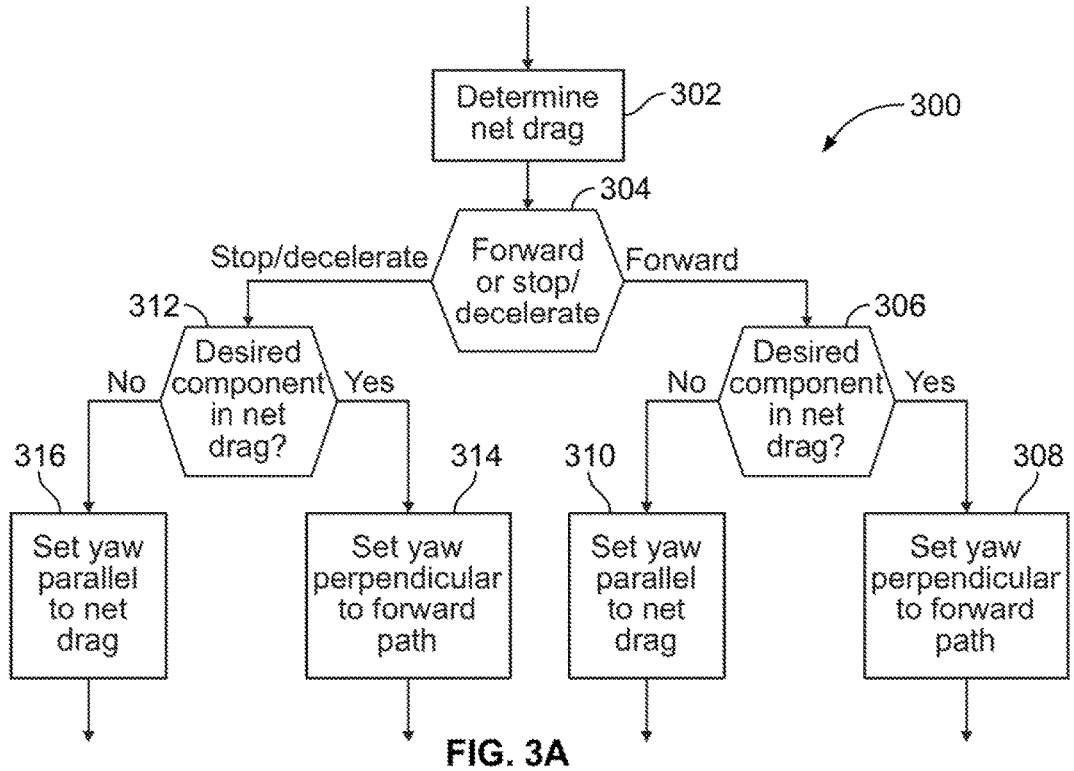
FIG. 3A
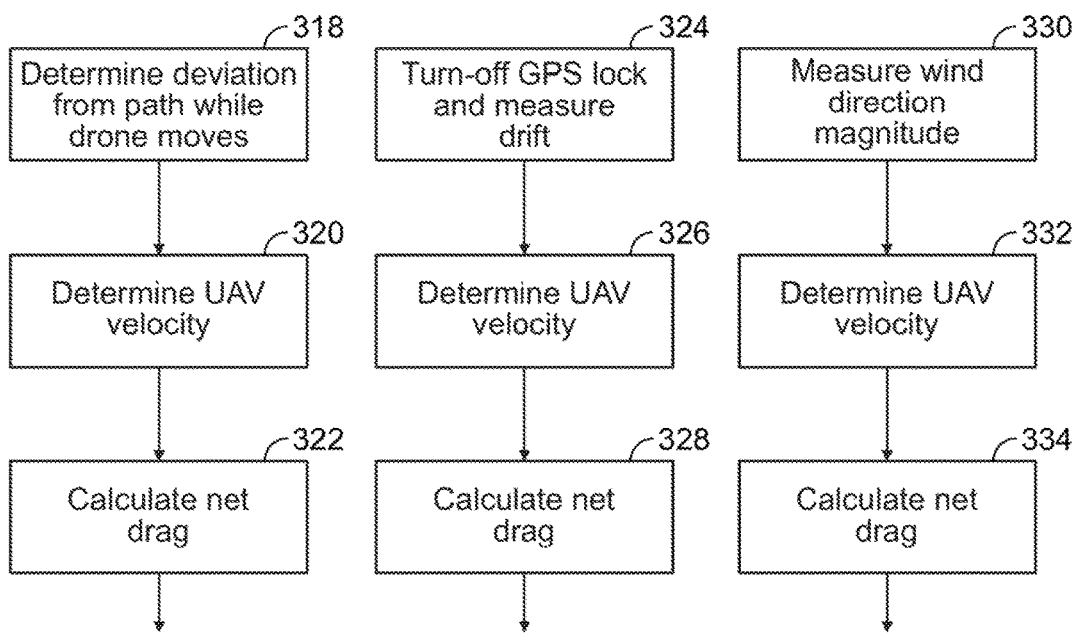
FIG. 3B   FIG. 3C   FIG. 3D

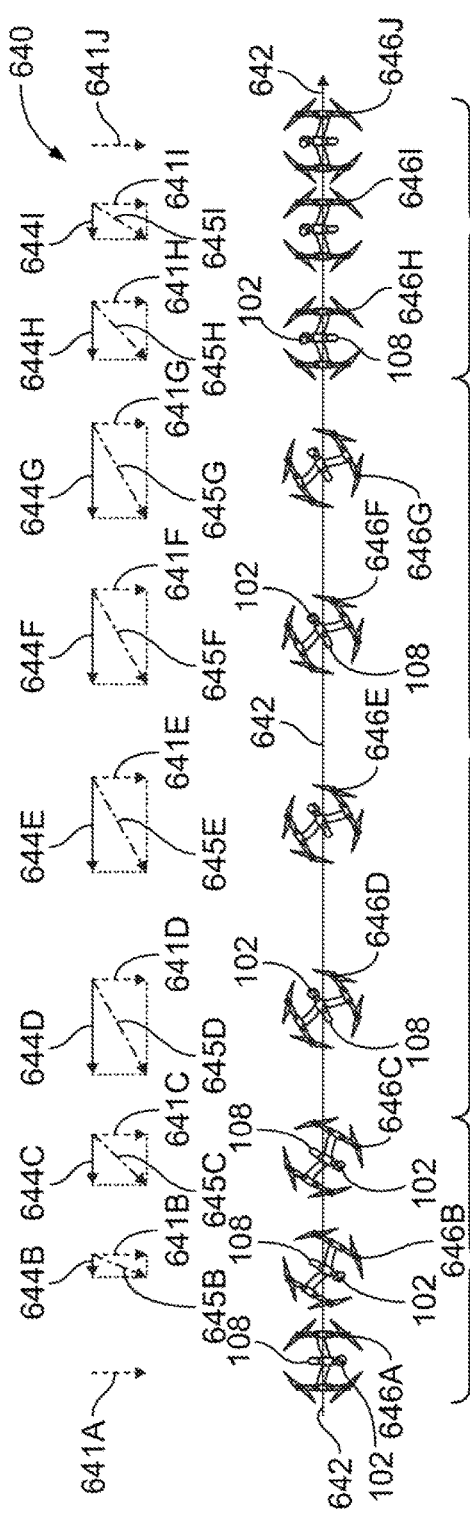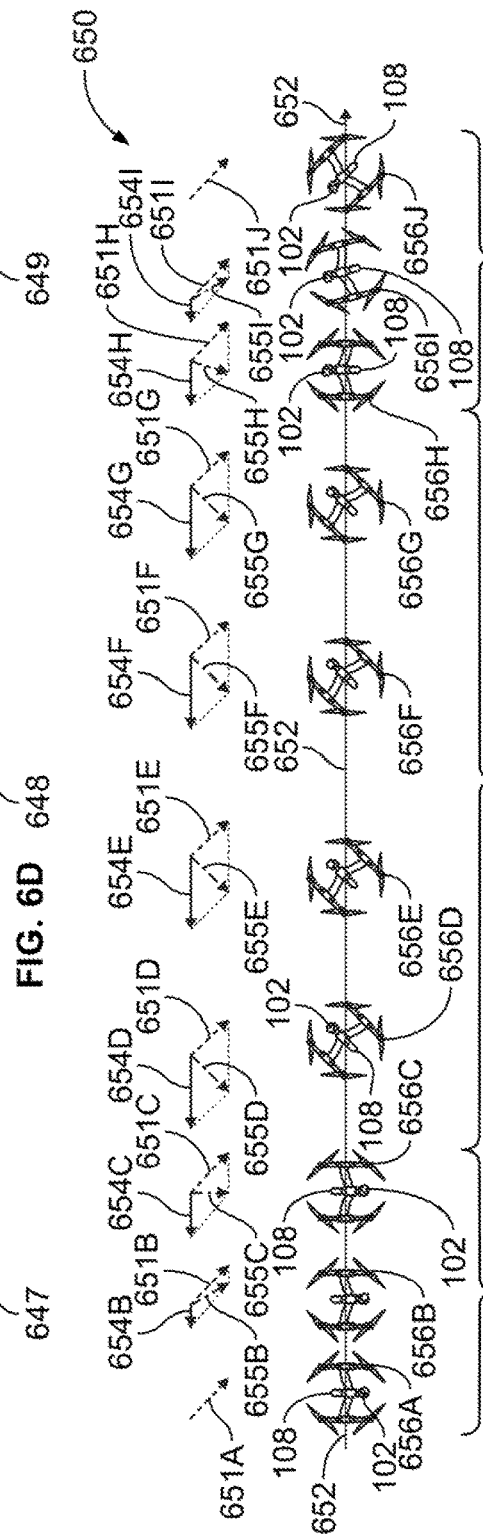

EXPLOITING OR AVOIDING AIR DRAG FOR AN AERIAL VEHICLE

BACKGROUND

The number of Unmanned Aerial Vehicles (UAVs) in use has increased rapidly in recent times. Over the same time period, the different type of situations and applications in which these UAVs may be put to use has also grown in number. This is due at least in part to increase in the sophistication and the capabilities of the technologies that may be utilized with UAVs. For example, UAVs are currently used for sophisticated mapping and surveillance applications, and the use of UAVs is also being contemplated for delivery service applications. Some of these UAV applications may have requirements that a UAV to remain aloft for long periods of time or travel intensively without frequent breaks during which the UAV may be serviced. These types of requirements may place heavy demands on the power efficiency of a UAV and the efficiency of the power source of a UAV's motors. Demands on power may be compounded by air drag on surfaces of the UAV generated by the velocity of the UAV, or created by wind forces, acting counter to UAV movement in a desired direction. The influence of air drag on an UAV may also be complicated by the fact that an UAV may have directionality in its shape. For example, in some UAVs the front may generate low resistance against air pressure while the side may generate high resistance against air pressure.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Methods and apparatus that allow exploitation and/or avoidance of air drag on aerial vehicles (AVs) are disclosed herein. The example embodiments of the methods and apparatus in this disclosure provide yaw setting for a AV based on atmospheric forces acting on the AV. Depending on the direction of a net effect of the forces on a AV and a desired maneuver of the AV, the embodiments allow exploitation and/or avoidance of the forces to increase energy efficiency of the AV. For example, in one implementation, when the shape of a AV has directionality in terms of air drag, the methods and apparatus for yaw setting may be used to set the yaw of the AV to utilize the shape of the AV. In this implementation a net drag on the AV caused by atmospheric forces may be determined and, then, a yaw setting that exploits the net drag, or avoids or reduces the net drag, based on the shape of the AV may be determined. The yaw setting may be determined based on the direction of the net drag and a desired maneuver of the AV, such as a maneuver to decelerate or stop, or to accelerate or move forward.

The method and apparatus may be implemented in a controller for an aerial vehicle. The controller may determine at least one parameter associated with force on the aerial vehicle, determine a yaw setting for the aerial vehicle based on the at least one parameter, and initiate a setting of the yaw of the aerial vehicle based on the determined yaw setting. In an implementation the at least one parameter may be a net drag and the controller may determine that the aerial vehicle is to execute a maneuver, for example move in a path while maintaining a constant speed, move in a path while accelerating, move in a path while decelerating, or execute a maneuver such as stopping. The controller may then determine a yaw setting for the aerial vehicle taking into account the influence of the net drag on the aerial vehicle while executing the maneuver. For example, when the controller determines the net drag, if the aerial vehicle is moving forward or accelerating in a path and the net drag contains a desired component force that acts to reinforce or add energy to the acceleration or movement, the controller may determine a yaw setting that sets the yaw of the aerial vehicle perpendicular to the forward path to exploit the net drag. If the net drag contains a component that acts to oppose the acceleration or movement, the controller may determine a yaw setting that sets the yaw of the aerial vehicle parallel to the net drag to avoid the net drag. The controller may determine updates for the net drag over time as the aerial vehicle moves and adjust the yaw accordingly. As the aerial vehicle accelerates to a constant speed the net drag may change due to a change in the velocity of the aerial vehicle and the controller may determine updated yaw settings accordingly. In another example, when the controller determines the net drag, if the aerial vehicle is decelerating or stopping along a path, and the net drag contains a desired component force that acts to reinforce or add energy to aid the deceleration or stopping, the controller may determine a yaw setting that sets the yaw of the aerial vehicle perpendicular to the path to exploit the net drag. If the net drag contains a component that acts to oppose the deceleration or stopping, the controller may determine a yaw setting that sets the yaw of the aerial vehicle parallel to the net drag to avoid the net drag.

In example embodiments, the controller may determine the at least one parameter as a net drag by determining a deviation of the aerial vehicle from a path, determining a velocity of the aerial vehicle, and determining the drag on the aerial vehicle based on the deviation and the aerial vehicle velocity. Alternately, the controller may determine the at least one parameter as a net drag by turning off a global positioning satellite (GPS) lock on the aerial vehicle, determining a drift of the aerial vehicle with the GPS lock off, determining a velocity of the aerial vehicle, and determining the drag on the aerial vehicle based on the drift and the aerial vehicle velocity. As another example alternative, the controller may determine the at least one parameter as a net drag by determining a wind direction and magnitude, determining a velocity of the aerial vehicle, and determining the drag on the aerial vehicle based on the wind direction and magnitude, and on the aerial vehicle velocity.

In the example embodiments, the controller may be implemented as a controller on an aerial vehicle or as a controller remote from the aerial vehicle, for example on a mobile device having an interface to a remote controller of the aerial vehicle. The controller may receive data on forces on the aerial vehicle from one or more sensors and determine least one parameter, for example a net drag, associated with the forces from the received data. The sensors may be located on the aerial vehicle or situated in a location remote from the aerial vehicle in which reliable data on the forces on the aerial vehicle may be measured.

BRIEF DESCRIPTION OF THE DRAWINGS

FIG. 1A shows a front view of a unmanned aerial vehicle into which an embodiment of the invention may be implemented;

FIG. 1B is a right side view of the unmanned aerial vehicle of FIG. 1A;

FIG. 1C is a front-right side view of the unmanned aerial vehicle of FIG. 1A;

FIG. 1D is a top view of the unmanned aerial vehicle of FIG. 1A-1C illustrating setting of yaw;

FIG. 3A is a flow diagram showing example operations for setting aerial vehicle yaw according to the embodiments of the disclosure;

FIGS. 3B-3D are flow diagrams showing operations for determining air drag according to the embodiments of the disclosure;

FIG. 6D is a diagram showing a side wind scenario and example yaw settings;

FIG. 6E is a diagram showing a back-and-side wind scenario and example yaw settings;

DETAILED DESCRIPTION

Figure 2:
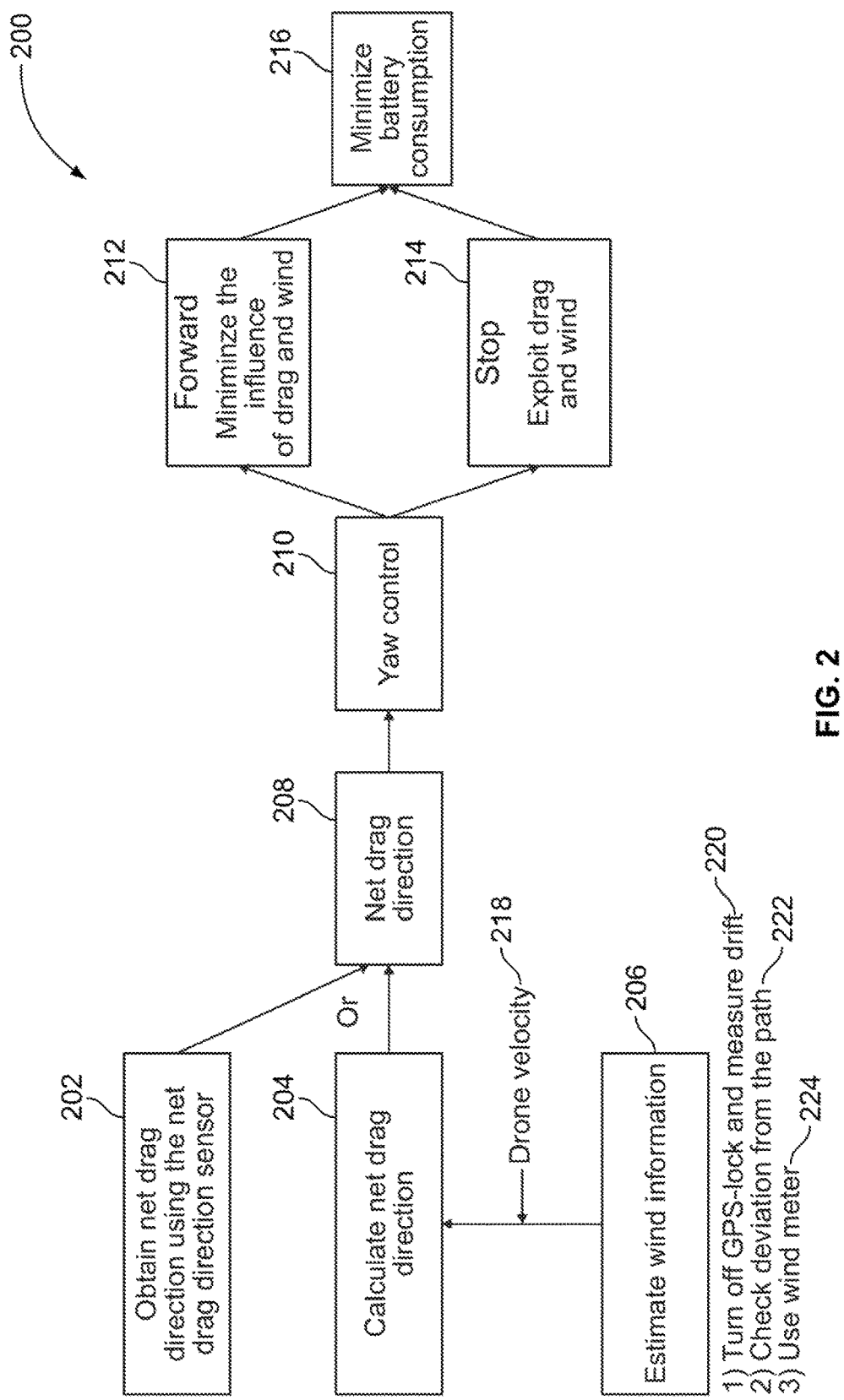
FIG. 2 is a diagram illustrating a process for exploiting or avoiding air drag in an aerial vehicle according to embodiments of the disclosure.

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus that allow exploitation and/or avoidance of air drag on aerial vehicles (AVs) The embodiments provide advantages through use of methods of exploiting or avoiding air drag so that energy demands on a power source of an AV are reduced. For example, the power consumption of a battery of an electrically powered AV may be reduced by exploiting atmospheric forces, such as a net air drag, that act on the AV in a way that aids or reinforces movement for a desired maneuver. Alternately, the power consumption of a battery of an electrically powered AV may be reduced by avoiding atmospheric forces, such as a net air drag, that act on the AV in a way that hinders or opposes movement for a desired maneuver. The embodiments may also be implemented in AVs using any other type of power source for propulsion such as, for example, combustible fuel or a solar power source. Also, in certain situations air drag may be exploited or avoided to provide faster acceleration or quicker deceleration or stopping for enhanced AV performance. AVs into which embodiments may be implemented include any type of aerial vehicle, including unmanned aerial vehicles (UAVs), drones or other vehicles upon which air drag may be exploited or avoided for energy efficiency.

Example implementations in which the embodiments provide technical advantages may be in an unmanned aerial vehicle (UAV) which has directionality in its shape. For example, a rotary wing UAV may be designed with a physical shape on which air drag may vary, depending on the direction of the atmospheric forces acting on the UAV. The UAV may have a shape in which portions of the UAV body are conventionally considered as the front and sides of the body because of aerodynamic shaping of the body. Typically, the portion that would be considered the front would exhibit less air resistance to forces that are perpendicular to the front portion than the side portion would exhibit to forces that are perpendicular to the side portion. With this type of UAV the air drag is typically considered minimized by virtue of the designed shape of the UAV and the effects of air drag that change with a particular situation are not considered. Use of the embodiments in these implementations allow air drag to be exploited or avoided according to a given situation in order to minimize energy consumption of the power source of the UAV by controlling the UAV's yaw. In other implementations, the shape of an UAV with no directionality in the shape may be modified by attaching an object with a directional surface to the UAV. The directionality of the modified shape may then be utilized to exploit or avoid air drag according to the embodiments. Additionally, if a UAV is carrying cargo, such as a container, directionality in the shape of the cargo may be utilized to exploit or avoid air drag effects on the UAV's maneuvers.

Technical advantages are provided by reduced energy consumption demands on the power source of an UAV. The reduced energy consumption may provide longer flight times during which an UAV may stay aloft. Longer flight times could provide more efficient use of UAVs in applications such as the mapping of large areas, long distance delivery and surveillance. Also, faster acceleration and quicker deceleration, or stopping, provided by exploitation or avoidance of air drag provide a technical advantage in applications where enhanced performance is desirable. Technical advantages are also provided by configuring implementations that dynamically determine and set yaw of a UAV for additional efficiency. For example, the determination and setting of the yaw may be performed at certain predetermined points in time, for example based on a timer that triggers yaw adjustment. The determination and setting of the yaw may also be performed based upon a certain event occurring, for example when a UAV begins a new maneuver such as beginning to accelerate or decelerate, or starting to maintain a constant speed. The yaw determination and setting may also be performed more frequently during certain periods or maneuvers. For example, during acceleration or deceleration the frequency of the yaw determination and setting may be increased to account for the fact that changes in the velocity of a UAV may cause the net drag to change rapidly.

Embodiments of the disclosure may also be combined with other techniques for efficient UAV operation. For example, when a UAV is surveilling, plotting or mapping an area of land with a flight plan plotted or planned for time or energy efficiency using a point selection or area selection mode the yaw determination and setting process may be utilized. In this situation the yaw determination and setting process may be configured to determine and adjust the yaw of a UAV at each waypoint of the plotted flight plan when the UAV stops and turns or reduces its speed.

Referring now to FIGS. 1A and 1B, therein are a front and right side view, respectively, of an unmanned aerial vehicle (UAV) 100 into which an embodiment of the invention may be implemented. UAV 100 may be considered to have a front portion 102, a rear portion 108, a right side portion 104a and a left side portion 104B. A camera or other instrumentation 110 may be attached to the front portion 102. Rotary motors 106A-106D may be electrically powered to provide the power to propel UAW 100 to make desired maneuvers while airborne. FIGS. 1A and B illustrate that UAV 100 has a directionality associated with it shape. Front portion 102 will generate less air resistance to atmospheric forces or air pressure acting directly or nearly directly on front portion 102 as compared to the air resistance side portion 104A or 104B will generate to atmospheric forces or air pressure acting directly or nearly directly on side portion 104A or 104B. Similarly, rear portion 108 will also generate less air resistance to atmospheric forces or air pressure acting directly or nearly directly on rear portion 108 as compared to the air resistance side portion 104A or 104B will generate to atmospheric forces or air pressure acting directly or nearly directly on side portion 104A or 104B.

FIG. 1C shows a front-right side view of the UAV 100 of FIGS. 1A and 1B. FIG. 1C shows the directionality in the shape of UAV 100 from a different angle that illustrates how front portion 102 with its smaller surface area will generate less resistance to air pressure or atmospheric forces acting on the front of UAV 100 as compared to resistance generated by side portion 104 A or 104B to air pressure or atmospheric forces acting on the side of UAV 100. FIG. 1C also shows an example implementation of equipment for measuring atmospheric forces on UAV 100 as meter attachment 116. Meter attachment 116 may be attached to the top of UAV 100 for measuring atmospheric forces caused by wind and the motion of UAV 100. Meter 116 includes a portion comprised of a front section 118 and back fin 114, and a shaft 112. Shaft 112 may be used to attach meter 116 to appropriate measurement instrumentation in UAV 100. Front section 118 and fin 114 may then be used to measure the direction of atmospheric forces acting as the net drag on UAV 100. In other implementations, any other type of equipment may also be utilized to measure wind information such as direction or magnitude of wind acting in the environment of UAV 100 and determine net drag from the wind information and velocity of UAV 100. For example, global positioning system (GPS) equipment may be utilized by turning off the GPS lock and measuring drift of the UAV 100 to obtain wind information. Alternately, deviation of UAV 100 from its flight path while it moves may be measured or wind meters may be used to determine wind information. The net drag may then be determined from the wind information and the velocity of UAV 100.

Referring now to FIG. 1D, therein is a top view of UAV 100 of FIGS. 1A-1C in several example positions that illustrate setting of yaw according to embodiments of the disclosure. In FIG. 1D line 120 represents the flight path of UAV 100 which goes from left to right. In the position show by reference numeral 100a, UAV 100 is illustrated in a position with the axis 122 of UAV 100 that runs from front portion 102 through rear portion 108 aligned along path 120 with front portion 102 at the leading edge in the direction of motion. The yaw angle may be 0 degrees for position 100a. In the position shown by reference numeral 100c, UAV 100 is illustrated in a position with the axis 122 of UAV 100 at an angle to path 120 with front portion 102 at the leading edge in the direction of motion but pointing at an angle. The yaw angle shown by curved line 124 may be between 0 and 90 degrees for position 100b. In the position shown by reference numeral 100b, UAV 100 is illustrated in a position with the axis 122 of UAV 100 perpendicular to path 120 with front portion 102 and rear portion 108 each approximately on the leading edge in the direction of motion. The yaw angle shown by curved line 124 may be approximately 90 degrees for perpendicular position 100b.

The example positions shown in FIG. 1D may be utilized in various embodiments of the disclosure along with any other positions at other yaw angles that may be set by varying the yaw angle of UAV 100. A controller that determines an appropriate yaw setting from data associated with forces on UAV 100 may be implemented as a controller on an aerial vehicle or as a controller remote from the aerial vehicle. The controller may receive data on forces on the aerial vehicle from one or more sensors and determine least one parameter, for example a net drag, associated with the forces from the received data. The sensors may be located on the aerial vehicle or situated in a location remote from the aerial vehicle in which reliable data on the forces on the aerial vehicle may be measured. The controller may then initiate appropriate control signals so that UAV 100 is positioned with a yaw setting that exploits or avoids the effects of the net drag. The control signals may position the yaw by setting the relative speeds of rotary motors 106A-106D to orient UAV 100 in the desired position.

Referring now to FIG. 2, therein is a diagram 200 illustrating an implementation of an overall process for exploiting or avoiding air drag in an aerial vehicle that may be implemented, for example, in UAV 100. The process may begin at 202 or, alternately, may begin at 206. If the process begins at 202 a net drag of atmospheric forces acting on UAV 100 is obtained by using a net drag directional sensor. The net drag directional sensor may be implemented, for example, as meter 116 shown in FIG. 1C. If the process begins at 206 an estimate of wind information is first obtained. The wind information may comprise wind direction and magnitude and may be measured as shown at operation 220 by turning off the GPS lock and measuring drift of the UAV 100 to obtain wind direction and magnitude information. Alternately, operation 222 may be used to check deviation of UAV 100 from its flight path while it moves to obtain wind direction and magnitude, or operation 224 may be performed by using wind meters may to determine wind direction and magnitude. The velocity of UAV 100 may be obtained at 218 and, at 204, the net drag on UAV 100 may be determined from the wind information and the velocity. From both entry at 202 or 206, the net drag direction, 208, is then input to the yaw control process at 210.

At 210 the yaw control process uses the net drag data to determine a yaw setting for UAV 100. In the embodiment of FIG. 2, if UAV 100 is to move forward, or is moving forward, the process moves to 212 and a yaw is determined and set so that the influence of drag and wind on the forward motion of UAV 100 is minimized. If UAV is to stop or decelerate, the process moves to 214 and a yaw is determined and set so that the drag and wind for stopping or decelerating UAV 100 is exploited to aid UAV 100 in stopping or decelerating. At 216, the setting of the yaw then acts to minimize battery power consumption as UAV 100 operates.

Referring now to FIG. 3A, therein is a flow diagram showing example operations for setting aerial vehicle yaw according to an embodiment of the disclosure. The embodiment of FIG. 3A may be implemented using a controller, for example, in UAV 100 or as a controller remote from the UAV 100, for example on a mobile device having an interface to a remote controller of the aerial vehicle. The controller may include one or more processors or processing units and memory including code with instructions for executing the yaw control process operations. The controller may receive data on forces on the aerial vehicle, such as wind direction and magnitude, and other data, such as velocity of UAV 100, from one or more sensors. The controller may determine least one parameter, for example a net drag, associated with the forces from the received data. The sensors may be located on the aerial vehicle or situated in a location remote from the aerial vehicle where reliable data on the forces on the aerial vehicle may be measured. The sensors may include any equipment or apparatus that may measure the forces on the aerial vehicle directly or indirectly, such as wind meters, GPS based measurement equipment or other measurement devices. In one implementation the controller may be implemented as part of the autopilot system of the UAV 100. Based on the determinations made from the received data, the controller may also initiate the sending of instructions to UAV 100 that cause UAV 100 to change its yaw according to the embodiments.

Referring again to FIG. 3A, the process begins at 302 where net drag on the UAV is determined. The net drag may be determined at 30, for example, by one of the example processes shown in FIGS. 3B-3D. Referring to FIGS. 3B-3D, in FIG. 3B, at 318 a deviation of UAV 100 from its flight path is determined. The deviation may be determined, for example, using GPS data. Wind direction and magnitude may then be estimated from the deviation. At 320 UAV velocity is determined, and at 322 net drag is determined from the velocity and wind information. FIG. 3C shows an alternate example implementation for determining net drag. At 324 a GPS lock on the aerial vehicle is turned off and drift of the aerial vehicle with the GPS lock off is determined. The drift may be determined, for example, by using GPS data. Wind direction and magnitude may then be estimated from the drift information. At 326 velocity of the aerial vehicle is determined, and at 328 net drag is determined from the velocity and wind information. FIG. 3D shows another alternative example implementation for determining net drag. The operations of FIG. 3D are similar to FIGS. 1A-1B with the difference being that wind direction and magnitude are measured at 330 using wind meters, which may be located on the UAV 100 or located remotely from the UAV 100. As a further alternative for determining a net drag directional sensor may be used. The net drag directional sensor may be implemented, for example, as meter 116 shown in FIG. 1C.

Based on the net drag determined at 302 the process will determine a yaw setting for the aerial vehicle based on the net drag and initiate setting of the yaw of the aerial vehicle based on the yaw setting. Referring again to FIG. 3A, a determination is made at 304 as to whether UAV 100 is to maneuver by moving forward or stopping. Moving forward may include moving forward at a constant speed, or accelerating from a standstill or from a first speed to a second speed. Stopping may include stopping movement or decelerating from a first speed to a standstill or to a second speed. The information used in the determination at 304 may be generated by an autopilot system in UAV 100 or from other systems controlling UAV 100, such as a remote control system that is sending control signals to UAV 100. If it is determined that UAV 100 is to maneuver forward the process moves to 306. If it determined that UAV 100 is to stop or decelerate the process moves to 312.

At 306, if it was determined at 304 that UAV 100 is to maneuver forward, it is determined if a selected component, where the selected component is a desired component, is contained in the net drag. If a desired component is contained in the net drag the process moves to 308. At 308 the yaw is set perpendicular to the forward path of UAV 100. If a desired component is not contained in the net drag the process moves to 310. At 310 the yaw is set parallel to the net drag on UAV 100.

At 312, if it was determined at 304 that UAV 100 is to stop or decelerate, it is determined if a selected component, where the selected component is a desired component, is contained in the net drag. If the selected component is contained in the net drag the process moves to 314. At 314 the yaw is set perpendicular to the forward path of UAV 100. If a desired component is not contained in the net drag the process moves to 316. At 316 the yaw is set parallel to the net drag on UAV 100.

Figure 4A:
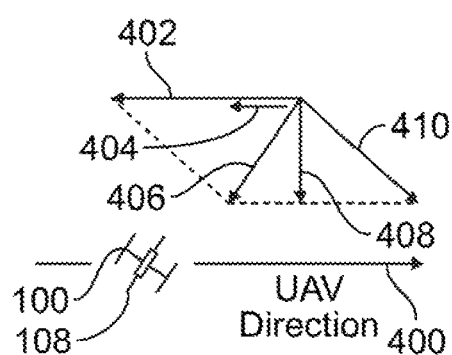
FIG. 4A-4B are diagrams showing an air drag scenario and example yaw settings for an aerial vehicle according to FIG. 2.

FIG. 4A is a diagram showing an example air drag scenario and an example yaw setting for an aerial vehicle, such as UAV 100, when UAV 100 is to maneuver by moving forward. FIG. 4A shows UAV 100 moving in a path left to right along line 400. Atmospheric forces acting on UAV 100 are represented by arrowed lines 402-410. Forces caused by wind 410 and forward velocity (opposite to UAV velocity) 402 create a net drag 406 on UAV 100. The net drag 406 includes a component 404 and a component 408. Because UAV 100 is moving forward along path 400, component 404 is a force in the opposite direction and acts to resist the forward movement. Component 404 is an undesired component. Also, because UAV 100 is moving forward along path 400, component 408 is a force in the perpendicular direction to forward movement and causes UAV 100 to deviate from the forward movement along path 400. Therefore, component 408 is also an undesired component.

In the scenario of FIG. 4A the process of FIGS. 3A-3D would determine the net drag 406, determine that UAV 100 is to move forward along path 400, and determine that there is no desired component, of the components 404 or 408, in the net drag based on the net drag and the desired maneuver of moving forward. Because there is no desired component in the net drag 406, the process would then set the yaw of UAV 100 parallel to the net drag 406 as shown by the position of UVA 100 with its yaw set so that its axis that runs from front 102 to rear 108 is parallel to net drag 406. This acts to avoid or reduce drag on the forward movement.

Figure 4B:
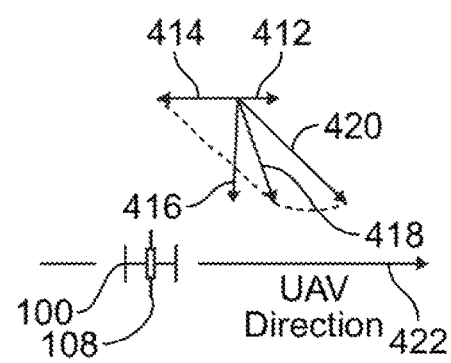

FIG. 4B is a diagram showing another example air drag scenario and an example yaw setting for an aerial vehicle, such as UAV 100, when UAV 100 is to maneuver by moving forward. FIG. 4B shows UAV 100 moving in a path left to right along line 422. Atmospheric forces acting on UAV 100 are represented by arrowed lines 412-420. Forces caused by wind 420 and forward velocity drag (opposite to UAV velocity) 414 create a net drag 418 on UAV 100. The net drag 418 includes a component 412 and a component 416. Because UAV 100 is moving forward along path 400, component 412 is a force in the same direction and acts to aid the forward movement. Component 412 is a desired component. Also, because UAV 100 is moving forward along path 422, component 416 is a force in the perpendicular direction to forward movement and causes UAV 100 to deviate from the forward movement along path 422. Therefore, component 416 is an undesired component.

In the scenario of FIG. 4B the process of FIGS. 3A-3D would determine the net drag 418, determine that UAV 100 is to move forward along path 422, and determine that there is a desired component, 412, of the components 412 or 416 in the net drag based on the net drag and the desired maneuver of moving forward. Because there is a desired component in the net drag 418, the process would then set the yaw of UAV 100 perpendicular to path of forward movement along line 422 as shown by the position of UVA 100 with its yaw set so that its axis that runs from front 102 to rear 108 is perpendicular to line 422. This acts to aid or reinforce the forward movement.

Figure 5A:
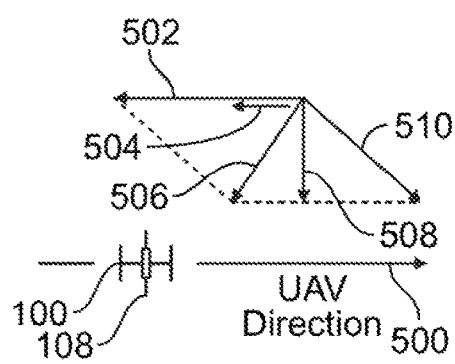
FIG. 5A-5B are diagrams showing an air drag scenario and example yaw settings for an aerial vehicle according to FIG. 2.

FIG. 5A is a diagram showing an example air drag scenario and an example yaw setting for an aerial vehicle, such as UAV 100, when UAV 100 is to maneuver by stopping or decelerating. FIG. 5A shows UAV 100 stopping or decelerating from movement along a path left to right along line 500. Atmospheric forces acting on UAV 100 are represented by arrowed lines 502-510. Forces caused by wind 510 and forward velocity (opposite to UAV velocity) 502 create a net drag 506 on UAV 100. The net drag 506 includes a component 504 and a component 508. Because UAV 100 is stopping or decelerating from movement along path 500, component 504 is a force in the opposite direction of the movement and acts to aid and reinforce the stopping or deceleration. In this scenario component 504 is a desired component. However, because UAV 100 is moving forward along path 500, component 508 is a force in the perpendicular direction to forward movement direction and the stopping or deceleration. Component 508 causes UAV 100 to deviate from the path 500. Therefore, component 508 is an undesired component.

In the scenario of FIG. 5A the process of FIGS. 3A-3D would determine the net drag 506, determine that UAV 100 is to stop or decelerate from movement along path 500, and determine that there is a desired component, of the components 504 or 508, in the net drag based on the net drag and the desired maneuver of stopping or decelerating. Because there is a desired component in the net drag 506, the process would then set the yaw of UAV 100 perpendicular to path 500, with its yaw set so that its axis running from front 102 to rear 108 is perpendicular movement along path 500. This aids or reinforces the stopping or deceleration.

Figure 5B:
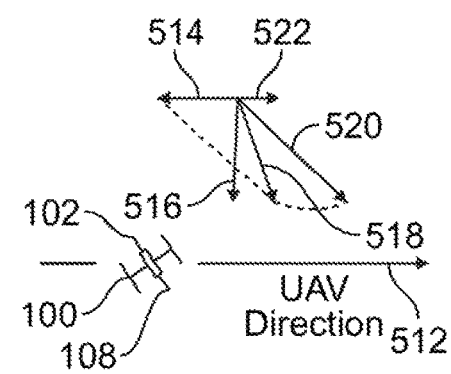

FIG. 5B is a diagram showing an another example air drag scenario and an example yaw setting for an aerial vehicle, such as UAV 100, when UAV 100 is to maneuver by stopping or decelerating. FIG. 5b shows UAV 100 stopping or decelerating from movement along a path left to right along line 512. Atmospheric forces acting on UAV 100 are represented by arrowed lines 514-522. Forces caused by wind 520 and forward velocity (opposite to UAV velocity) 514 create a net drag 518 on UAV 100. The net drag 518 includes a component 522 and a component 516. Because UAV 100 is stopping or decelerating from movement along path 512, component 522 is a force in the direction of the movement and acts against the stopping or deceleration. In this scenario component 522 is an undesired component. In addition, because UAV 100 is moving forward along path 512, component 516 is a force in the perpendicular direction to the forward movement direction and the direction of the stopping or deceleration. Component 516 causes UAV 100 to deviate from the path 512. Therefore, component 516 is an undesired component.

In the scenario of FIG. 5B the process of FIGS. 3A-3D would determine the net drag 518, determine that UAV 100 is to stop or decelerate from movement along path 512, and determine that there is no desired component, of the components 516 or 522, in the net drag based on the net drag and the desired maneuver of stopping or decelerating. Because there is no desired component in the net drag 518, the process would then set the yaw of UAV 100 parallel to the net drag 518 as shown by the position of UVA 100 with its yaw set so that its axis that runs from front 102 to rear 108 is parallel to net drag 518. This acts to avoid or reduce drag that would negatively affect the maneuver of stopping or deceleration.

Figure 6A:
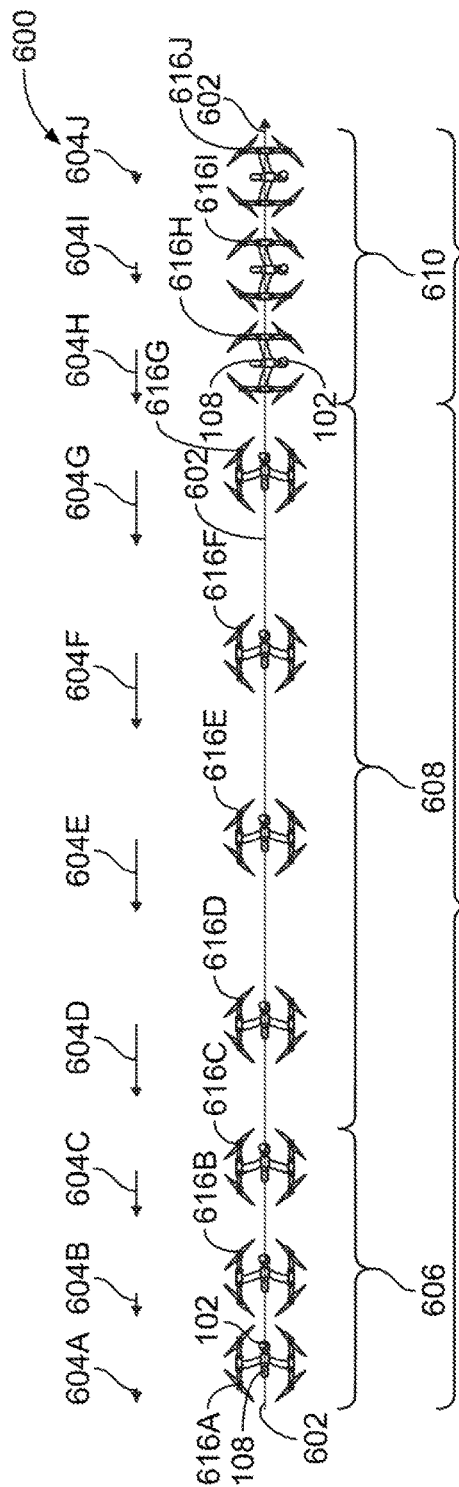
FIG. 6A is a diagram showing a no wind scenario and example yaw settings.

FIG. 6A is a diagram showing a no wind scenario and example yaw settings. In FIG. 6A UAV 100 is shown in a sequence of locations 616A-616J as it moves left to right along a path shown by line 602. In the portion of the path shown by bracket 614 UAV 100 maneuvers to move forward. Because there is no wind, the velocity of UAV 100 causes a net drag force shown by arrows 604A-604J at each of the locations 616A-616J, respectively, that acts in a direction to parallel to path 602 against forward movement. Within bracket 614, in the portion of the path shown by bracket 606, UAV 100 is accelerating and, in the portion of the path shown by bracket 608, UAV 100 maintains a constant speed. In the portion of the path shown by bracket 612 UAV 100 maneuvers to stop. Within bracket 612, in the portion of the path shown by bracket 610, UAV 100 decelerates to stop.

In the scenario of FIG. 6A, as UAV 100 moves along path 602, the process of FIGS. 3A-3D would determine the net drag, determine whether UAV 100 is to maneuver by moving forward, stopping or decelerating, determine whether there is desired component in the net drag based on the net drag and the desired maneuver, and initiate setting of a yaw to exploit or avoid the net drag. For example, when UAV is accelerating and moves in locations 616A-616C the process sets the yaw of UAV 100 parallel to the net drag 604A-604C, respectively, as UAV 100 moves to avoid and minimize the effect of the drag on forward movement. This is done by setting UAV 100 in a position with the axis of UAV 100 that runs from front portion 102 through rear portion 108 aligned along path 602 with front portion 102 at the leading edge in the direction of motion. When UAV 100 maintains a constant speed and moves through locations 616D-616G the process keeps the yaw in the same setting because UAV 100 is still moving in the forward direction and the net drags 604D-604G do not change. When UAV 100 begins to decelerate and moves though locations 616G-616J, the process sets the yaw of UAV 100 perpendicular to the net drag 604H-604J, respectively, to exploit the effect of the drag against forward movement. This is done by setting the axis of UAV 100 that runs from front portion 102 through rear portion 108 in a position perpendicular to path 602 in the direction of motion.

Figure 6B:
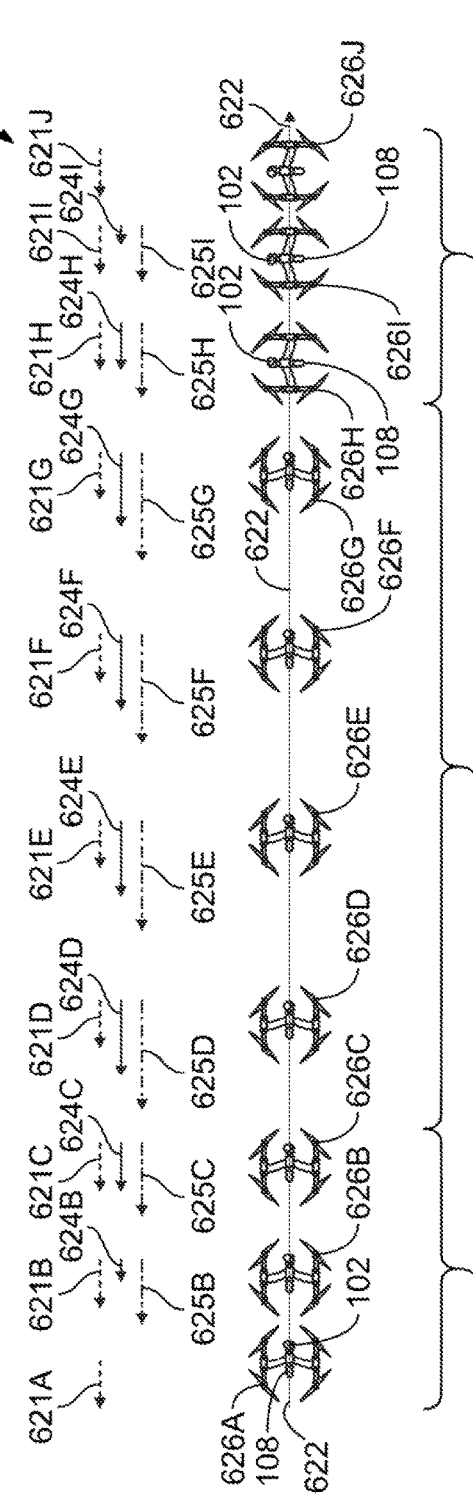
FIG. 6B is a diagram showing a head wind scenario and example yaw settings.

FIG. 6B is a diagram showing a head wind scenario and example yaw settings. In FIG. 6B UAV 100 is shown in a sequence of locations 626A-626J as it moves left to right along a path shown by line 622. In the portion of the path shown by bracket 627, UAV 100 is accelerating and, in the portion of the path shown by bracket 628, UAV 100 maintains a constant speed. In the portion of the path shown by bracket 629, UAV 100 decelerates to stop. There is a head wind, shown by each of the arrows 621A-621J at each location 626A-626J, respectively, as UAV 100 moves along path 622. There is also a drag caused by the velocity of UAV 100, shown by each of the arrows 624B-624I at each location 626B-626I, respectively, as UAV 100 moves along path 622. The head wind and drag caused by the velocity of UAV 100 act together to create a net drag, shown by each of the arrows 625B-625I, at each location 626B-626I, respectively, as UAV 100 moves along path 622.

In the scenario of FIG. 6B, as UAV 100 moves along path 622, the process of FIGS. 3A-3D would determine the net drag, determine whether UAV 100 is to maneuver by moving forward, stopping or decelerating, determine whether there is desired component in the net drag based on the net drag and the desired maneuver, and initiate setting of a yaw to exploit or avoid the net drag. For example, when UAV is accelerating and moves in locations 626A-626C the process sets the yaw of UAV 100 parallel to the net drag 625B-625C, respectively, as UAV 100 moves to avoid and minimize the effect of the drag on forward movement. When UAV 100 maintains a constant speed and moves through locations 626D-626H the process keeps the yaw in the same setting because UAV 100 is still moving in the forward direction and the net drags 625D-625G do not change. When UAV 100 begins to decelerate and moves though locations 626H-626J, the process sets the yaw of UAV 100 perpendicular to the net drag 625H-625I, respectively, to exploit the effect of the drag against forward movement.

Figure 6C:
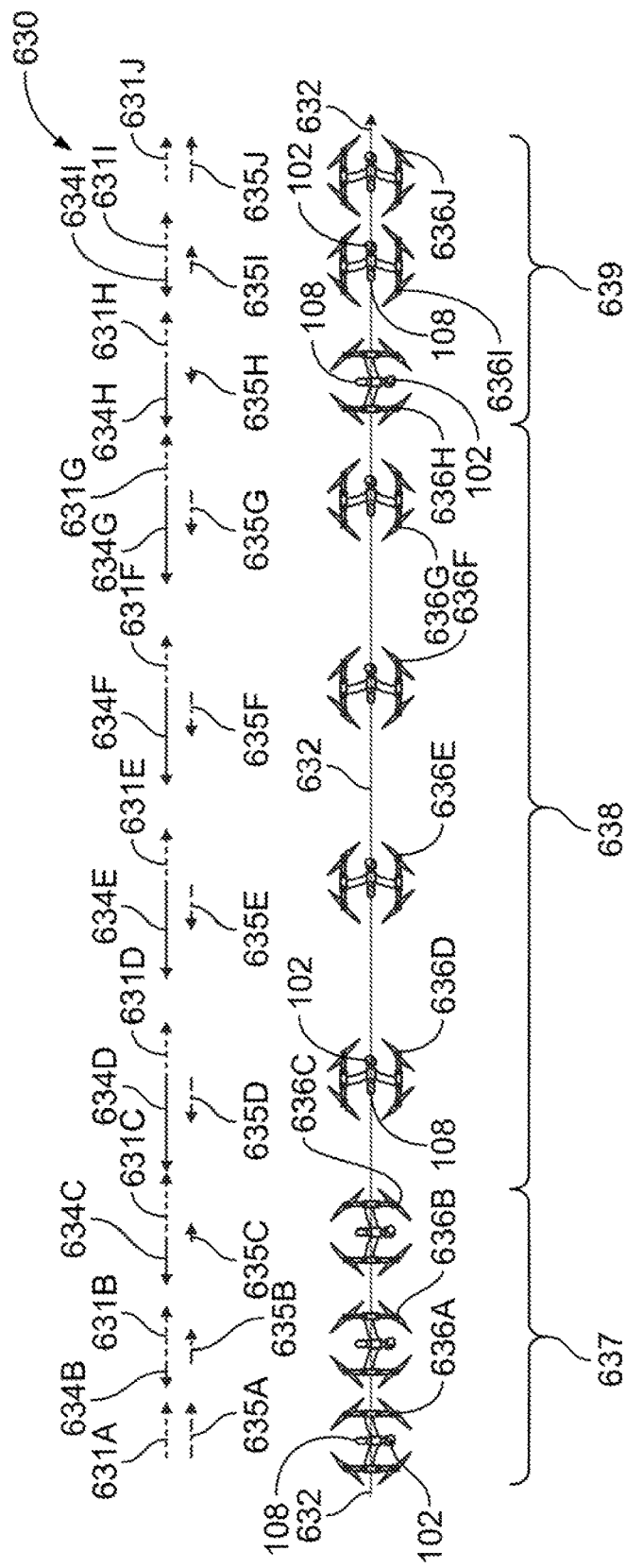
FIG. 6C is a diagram showing a back wind scenario and example yaw settings.

FIG. 6C is a diagram showing a back wind scenario and example yaw settings. In FIG. 6C UAV 100 is shown in a sequence of locations 636A-636J as it moves left to right along a path shown by line 632. In the portion of the path shown by bracket 637, UAV 100 is accelerating and, in the portion of the path shown by bracket 638, UAV 100 maintains a constant speed. In the portion of the path shown by bracket 639, UAV 100 decelerates to stop. There is a back wind, shown by each of the arrows 631A-631J at each location 636A-636J, respectively, as UAV 100 moves along path 632. There is also a drag caused by the velocity of UAV 100, shown by each of the arrows 634B-634I at each location 636B-636I, respectively, as UAV 100 moves along path 632. The back wind and drag caused by the velocity of UAV 100 act together to create a net drag, shown by each of the arrows 635A-635J, at each location 636A-636J, respectively, as UAV 100 moves along path 632.

In the scenario of FIG. 6C, as UAV 100 moves along path 632, the process of FIGS. 3A-3D would determine the net drag, determine whether UAV 100 is to maneuver by moving forward, stopping or decelerating, determine whether there is desired component in the net drag based on the net drag and the desired maneuver, and initiate setting of a yaw to exploit or avoid the net drag. For example, when UAV is accelerating and moves in locations 636A-636C the process sets the yaw of UAV 100 perpendicular to the net drag 635B-635C, respectively, as UAV 100 moves to exploit the effect of the drag on forward movement. At locations 636A-636C the net drag acts to aid or reinforce the forward movement of UAV 100. In the scenario of FIG. 6C, as UAV 100 accelerates along the portion of path 632 shown by bracket 637, the drag caused by the velocity of UAV 100, shown by arrows 634B-634C, becomes larger until the net drag created by the back wind and the velocity of UAV 100 becomes a net drag in the opposite direction at as shown by arrow 635D at location 636D. Therefore, at location 636D when UAV 100 begins to maintain a constant speed and moves through locations 636D-636G the process sets the yaw parallel to path 632 to avoid or minimize the net drag 635D-635G at locations 636D-636G, respectively. When UAV 100 begins to decelerate at location 636H because the net drag caused by the velocity of UAV 100 and the back wind is still acting counter to forward movement of UAV 100, as shown by arrow 635H, the process sets the yaw perpendicular to the net drag 635H, to exploit the effect of the drag against forward movement for deceleration. As UAV 100 decelerates along the portion of path 632 shown by bracket 639, the drag caused by the velocity of UAV 100, shown by arrows 634H-634I, becomes smaller until the net drag created by the back wind and the velocity of UAV 100 becomes a net drag in the direction at as shown by arrow 635I at location 636I. At location 636I the process then sets the yaw parallel to path 632 to avoid or minimize the net drag 635I-635J at locations 636I-636J, respectively.

FIG. 6D is a diagram showing a side wind scenario and example yaw settings. In FIG. 6D UAV 100 is shown in a sequence of locations 646A-646J as it moves left to right along a path shown by line 642. In the portion of the path shown by bracket 647, UAV 100 is accelerating and, in the portion of the path shown by bracket 648 UAV 100 maintains a constant speed. In the portion of the path shown by bracket 649 UAV 100 decelerates to stop. There is a side wind, shown by each of the arrows 641A-641J at each location 646A-646J, respectively, as UAV 100 moves along path 642. There is also a drag caused by the velocity of UAV 100, shown by each of the arrows 644B-644I at each location 646B-646I, respectively, as UAV 100 moves along path 642. The side wind and drag caused by the velocity of UAV 100 act together to create a net drag, shown by each of the arrows 645B-645I, at each location 646B-646I, respectively, as UAV 100 moves along path 642.

In the scenario of FIG. 6D, as UAV 100 moves along path 642, the process of FIGS. 3A-3D would determine the net drag, determine whether UAV 100 is to maneuver by moving forward, stopping or decelerating, determine whether there is desired component in the net drag based on the net drag and the desired maneuver, and initiate setting of a yaw to exploit or avoid the net drag. For example, when UAV 100 is at location 646A and just begins to move the net drag is made up of the side wind 641A. At location 646A the process sets the yaw parallel to wind 641A to avoid the drag caused by wind 641A. When UAV begins accelerating and moves through locations 646B-646C the drag caused by the velocity of UAV 100 increases and becomes a larger influence on the net drag as compared to the side wind 641B-641C and the net drag direction changes as shown by arrows 645B and 645C. As UAV 100 moves through locations 646B and 646C, the process sets the yaw of UAV 100 parallel to the net drag 645B-645C, respectively, to avoid the effect of the drag that acts to cause UAV 100 to deviate from forward movement. At location 646D when UAV 10 begins to maintain a constant speed and moves through locations 636D-636G the process sets the yaw parallel to net drag 645D-645G, respectively, to avoid or minimize the net drag. When UAV 100 begins to decelerate at location 646H because the net drag caused by the velocity of UAV 100 and the back wind is still acting as shown by arrow 645H there is a desired component of net drag 645H that can be exploited. The process then sets the yaw perpendicular to the path 642 of forward movement for deceleration to exploit the net drag for deceleration. As UAV 100 decelerates along the portion of path 642 shown by bracket 649, the drag caused by the velocity of UAV 100 shown by arrows 644H-644I becomes smaller until the net drag is created only by the side wind 641J at location 646J and UAV 100 has stopped.

FIG. 6E is a diagram showing a back-and-side wind scenario and example yaw settings. In FIG. 6E UAV 100 is shown in a sequence of locations 656A-656J as it moves left to right along a path shown by line 652. In the portion of the path shown by bracket 657, UAV 100 is accelerating and, in the portion of the path shown by bracket 658 UAV 100 maintains a constant speed. In the portion of the path shown by bracket 659 UAV 100 decelerates to stop. There is a back-and-side wind, shown by each of the arrows 651A-651J at each location 656A-656J, respectively, as UAV 100 moves along path 652. There is also a drag caused by the velocity of UAV 100, shown by each of the arrows 654B-

654I at each location 656B-656I, respectively, as UAV 100 moves along path 652. The back-and-side wind and drag caused by the velocity of UAV 100 act together to create a net drag, shown by each of the arrows 655B-655I, at each location 656B-656I, respectively, as UAV 100 moves along path 652.

In the scenario of FIG. 6E, as UAV 100 moves along path 652, the process of FIGS. 3A-3D would determine the net drag, determine whether UAV 100 is to maneuver by moving forward, stopping or decelerating, determine whether there is desired component in the net drag based on the net drag and the desired maneuver, and initiate setting of a yaw to exploit or avoid the net drag. For example, when UAV 100 is at location 656A and just begins to move the net drag is made up of the back-and-side wind 651A. At location 656A there is a desired component in the net drag caused by the back-and-side wind 651A that acts to aid or reinforce movement. At location 651A the process sets the yaw perpendicular to the forward path 652 to exploit the net drag. When UAV begins accelerating and moves through location 656B the drag 654B caused by the velocity of UAV 100 and back-side wind 651B creates a net drag as shown by arrow 655B. Because the net drag still contains a desired component, the process keeps the yaw perpendicular to the forward path 652. When UAV is accelerating and moves through location 656C the drag 654C caused by the velocity of UAV 100 increases and becomes a larger influence on the net drag as compared to the back-and-side wind 651C and the net drag changes to act in a direction shown by arrow 655C. At location 651D there is no desired component in the net drag. As UAV 100 moves through location 656C, the process sets the yaw of UAV 100 parallel to the net drag 655C to avoid the effect of the drag that acts to cause UAV 100 to deviate from forward movement. At location 646D when UAV 10 begins to maintain a constant speed and moves through locations 656D-656G the process sets the yaw parallel to net drag 655D-655G, respectively, to avoid or minimize the net drag. When UAV 100 begins to decelerate at location 656I-1 because the net drag caused by the velocity of UAV 100 and the back wind is still acting as shown by arrow 655H there is a desired component of net drag 655H that can be exploited. The process then sets the yaw of UAV 100 perpendicular to the path 652 of forward movement when beginning deceleration to exploit the net drag. As UAV 100 decelerates along the portion of path 652 shown by bracket 659, the drag caused by the velocity of UAV 100 shown by arrows 654H-654I becomes smaller until the net drag at location 656I acts against deceleration and contains no desired component. The process then sets the yaw of UAV 100 parallel to net drag 655I at location 656I to avoid the effect of the net drag. As UAV 100 decelerates and slows to a stop the drag caused by the velocity of UAV 100 becomes smaller until the net drag at location 656J is caused only by the back-and-side wind 651J. Just as UAV 100 stops at location 656J, the yaw is set parallel to the net drag or back-and-side wind 651J.

While the scenarios have shown example yaw setting that places front portion 102 of UAV 100 facing into the net drag when net drag is to be avoided, it is also possible to place rear portion 108 of UAV facing into the net drag to avoid the drag. This implementation may be used, for example, if it is desired to have front mounted camera 110 facing in a certain direction that is easier to maintain with rear portion 108 moving into the net drag, for example facing rearward to UAV 100.

Figure 7:
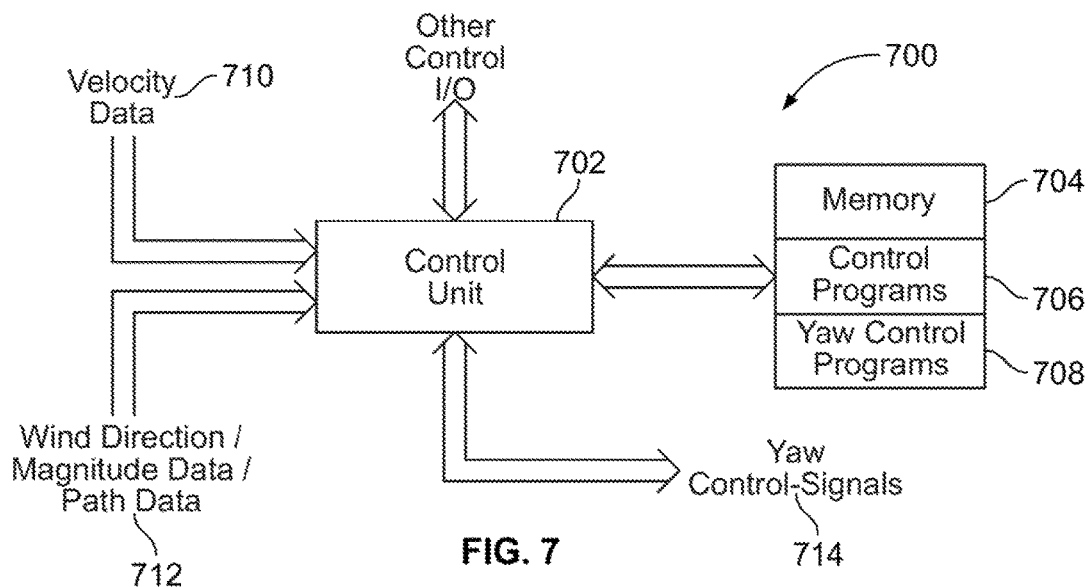
FIG. 7 is a simplified block diagram of a controller according to an embodiment of the disclosure; and, FIG. 8 is a block diagram of a controller implemented in a device application according to an embodiment of the disclosure.

Referring now to FIG. 7 therein simplified block diagram of a controller according to an embodiment of the disclosure. Controller 700 represents a possible implementation of a controller or device in which embodiments of the disclosure may be implemented. In one implementation controller 700 is located within a UAV, such as UAV 100 of FIGS. 1A-1D. Controller 700 also includes memory/storage 704 which is shown as including computer program code or instructions for yaw control programs 708. Memory 704 may also include code or instructions for control programs for the UAV operating system (OS) and other application control programs 706. Control unit 702 may receive data such as velocity data at inputs 710 and wind direction data, wind magnitude data, and UAV path data at inputs 712. When executed, yaw control programs 706 cause control unit 702 to control the controller 700 to use the received data to implement the processes disclosed herein, for example the processes of FIGS. 3A-3D. Controller 702 determines at least one parameter associated with force on the aerial vehicle, for example a net drag, determines a yaw setting for the aerial vehicle based on the at least one parameter, and initiates setting of the yaw of the aerial vehicle based on the yaw setting, for example by sending appropriate control signals to the flight control system of the UAV.

Memory 704 may be implemented as any type of computer readable storage media in device 700, including non-volatile and volatile memory. Memory 704 also may include data such video data, camera data and sensor data, and other files used in the operation of controller 700. Control or processing unit 702 may comprise one or more processors, or other control circuitry or any combination of processors and control circuitry. Control unit 700 may provide overall control of controller 700 and a UAV by executing instructions or code in memory 704 to provide necessary functions.

The example embodiments disclosed herein may be described in the general context of processor-executable code or instructions stored on memory that may comprise one or more computer readable storage media (e.g., tangible non-transitory computer-readable storage media such as memory 704). As should be readily understood, the terms "computer-readable storage media" or "non-transitory computer-readable media" include the media for storing of data, code and program instructions, such as memory 704, and do not include portions of the media for storing transitory propagated or modulated data communication signal.

Figure 8:
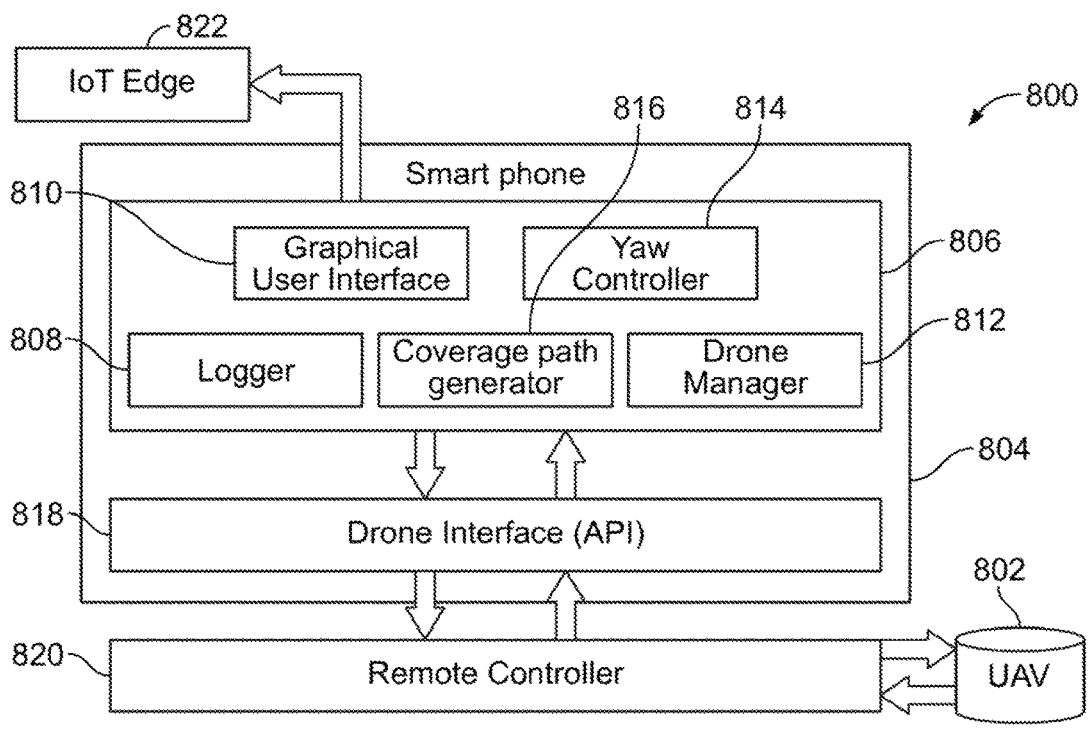

Referring now to FIG. 8, herein is a block diagram of a control system 800 implemented in a device application according to an embodiment of the disclosure. The control system may be used with any UAV, for example with a drone. FIG. 8 shows smart phone 804 that includes controller 806. Controller 806 may be implemented in a processing unit, or as one or more processors, including memory having computer executable instructions for implementing the functions of a graphical user interface 810, logger 808, coverage path generator 816, drone manager 812 and yaw controller 814. Controller 806 may communicate with a drone through drone interface 818 that sends and receives signals from a remote controller 820. Remote controller 820 may send and receive signals from the drone (UAV 802) to control the drone in flight. Yaw controller 814 determines at least one parameter associated with force on the aerial vehicle, for example a net drag, determines a yaw setting for the aerial vehicle based on the at least one parameter, and initiates setting of the yaw of the aerial vehicle based on the yaw setting by sending appropriate control signals to remote controller 820 which sends appropriate control signals to drone 802. The signals sent to drone 802 from remote controller 820 may include signals from yaw controller 814 that initiate settings of the yaw of the drone based on processing signals received from, for example, (Internet of Things) IOT Edge 822. Similarly to a controller located on the UAV 100, controller 806 may receive wind and velocity data remotely from sensors on UAV 100 or use sensors at appropriate locations away from UAV 100 where reliable wind and/or velocity data may be obtained.

Embodiments have been disclosed that include a controller for an aerial vehicle comprising a processing unit and memory including code. When executed the code controls the processing unit to determine at least one parameter associated with force on the aerial vehicle, determine a yaw setting for the aerial vehicle based on the at least one parameter, and initiate setting of the yaw of the aerial vehicle based on the yaw setting. The at least one parameter may comprise a drag and the code may be further executable to control the processing unit to determine the yaw setting by causing the processing unit to determine that the aerial vehicle is to move in a path, and determine the yaw setting for the aerial vehicle taking into account the influence of the drag on the aerial vehicle while moving in the path. The code may be further executable to control the processing unit to determine the yaw setting by determining that the aerial vehicle is to decelerate, and determining the yaw setting for the aerial vehicle taking into account the influence of the drag on the aerial vehicle while decelerating. The code may be still further executable to control the processing unit to determine the yaw setting for the aerial vehicle by determining if there is a selected component in the drag, and determining the yaw setting based on the drag and the determination of whether the selected component is in the drag. The code may be further executable to control the processing unit to determine the yaw setting for the aerial vehicle by determining a desired maneuver of the aerial vehicle, determining if there is a selected component in the drag based on the drag and the desired maneuver, and determining the yaw setting based on the determination of whether the selected component is in the drag. The code may also be executable to control the processing to determine the yaw setting based on the drag and a determination of whether the selected component is in the drag by determining the yaw setting parallel to the drag if the selected component is not in the drag. The code may be further executable to control the processing unit to determine the yaw setting based on the drag and the determination of whether the selected component is in the drag by determining the yaw setting perpendicular to a forward path of the aerial vehicle if the selected component is in the drag.

In the embodiments of the controller, the code may be executable to control the processing unit to determine the at least one parameter by determining a deviation of the aerial vehicle from a path, determining a velocity of the aerial vehicle, and determining a drag on the aerial vehicle based on the deviation and the velocity. The code may be further executable to control the processing unit to determine the at least one parameter by turning off a global positioning satellite (GPS) lock and determining a drift of the aerial vehicle, determining a velocity of the aerial vehicle, and determining a drag on the aerial vehicle based on the drift and the velocity. The code may be further executable to control the processing unit to determine the at least one parameter by determining a wind direction and magnitude, determining a velocity of the aerial vehicle, and determining a drag on the aerial vehicle based on the wind direction and magnitude, and the velocity.

Other embodiments have been disclosed that include an aerial vehicle comprising a processing unit and memory including code, which when executed controls the processing unit to determine at least one parameter associated with forces on the aerial vehicle, determine a yaw setting for the aerial vehicle based on the at least one parameter, and initiate setting of the yaw of the aerial vehicle based on the yaw setting. The code may be further executable to control the processing unit in the aerial vehicle to determine the at least one parameter by causing the processing unit to receive data measured in an external environment of the aerial vehicle, and determine at least one parameter associated with forces on the aerial vehicle based on the data. The at least one parameter may comprise a drag and the code may be further executable to control the processing unit in the aerial vehicle to determine the yaw setting by causing the processing unit to determine that the aerial vehicle is to move in a path and determine the yaw setting for the aerial vehicle to reduce the influence of the drag on the aerial vehicle while moving in the path. The code may be further executable to control the processing unit in the aerial vehicle to determine the yaw setting by causing the processing unit to determine that the aerial vehicle is to move in a path, and determine the yaw setting for the aerial vehicle to exploit the influence of the drag on the aerial vehicle while moving in the path. The code may be further executable to control the processing unit in the aerial vehicle to determine a yaw setting by causing the processing unit to determine that the aerial vehicle is to decelerate and determine the yaw setting for the aerial vehicle to exploit the influence of the drag on the aerial vehicle while decelerating. The code may be still further executable to control the processing unit in the aerial vehicle to determine the yaw setting by causing the processing unit to determine that the aerial vehicle is to decelerate and determine the yaw setting for the aerial vehicle to reduce the influence of the drag on the aerial vehicle while decelerating.

Embodiments of the disclosure also include a computer readable medium comprising instructions stored thereon, that when executed on a processor perform the steps of determining at least one parameter associated with forces on an aerial vehicle, determining a yaw setting for the aerial vehicle based on the at least one parameter, and initiating setting of the yaw of the aerial vehicle based on the yaw setting. The at least one parameter may comprise a drag and the instructions, when executed on the processor, may further perform the steps of determining that the aerial vehicle is to move in a path, and, determining the yaw setting for the aerial vehicle taking into account the influence of the drag on the aerial vehicle while moving in the path. The instructions may still further, when executed on the processor, may perform the steps of determining that the aerial vehicle is to decelerate, and, determining the yaw setting for the aerial vehicle taking into account the influence of the drag on the aerial vehicle while decelerating. The instructions further, when executed, may perform the steps of receiving data measured in an external environment of the aerial vehicle, and, determining the at least one parameter associated with forces on the aerial vehicle based on the data.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A controller for a rotary wing unmanned aerial vehicle having a plurality of rotary motors, the controller comprising:
   a processing unit and memory including code, which when executed controls the processing unit to:
   determine at least one parameter associated with force on the aerial vehicle as the controller controls the plurality of rotary motors to propel the aerial vehicle to move in a direction along a path;
   determine a setting for a yaw of the aerial vehicle based on the at least one parameter, wherein the yaw defines an angle between an axis running from a first portion to a second portion of the aerial vehicle and the direction of movement of the aerial vehicle along the path, wherein the first portion is a leading edge of movement of the aerial vehicle along the path; and
   set the yaw of the aerial vehicle based on the determined setting for the yaw, wherein the aerial vehicle is positioned according to the angle defined by the yaw by controlling the relative speeds of each of the plurality of rotary motors as the plurality of rotary motors propel the aerial vehicle to move in the direction along the path,
   wherein the setting of the yaw of the aerial vehicle is determined based on a force parameter such that air drag is used to advantageously assist moving the aerial vehicle along the path or inhibit moving the aerial vehicle along the path.

2. The controller of claim 1, wherein at least one parameter comprises a drag and the code is executable to control the processing unit to determine the setting for the yaw by causing the processing unit to:
   determine that the aerial vehicle is to move in the direction along the path; and,
   determine the setting for the yaw of the aerial vehicle taking into account the influence of the drag on the aerial vehicle while the plurality of rotary motors propel the aerial vehicle to move in the direction along the path.

3. The controller of claim 2, wherein at least one parameter comprises a drag, the setting for the yaw comprises a first setting for the yaw, and the code is executable to control the processing unit to further cause the processing unit to:
   determine that the aerial vehicle is to decelerate; and,
   determine a second setting for the yaw of the aerial vehicle taking into account the influence of the drag on the aerial vehicle while decelerating.

4. The controller of claim 1, wherein the at least one parameter comprises a drag and the code is executable to control the processing unit to determine the setting for the yaw of the aerial vehicle by causing the processing unit to:
   determine that a component is included in the drag; and,
   determine the setting for the yaw of the aerial vehicle based on the drag and the determination that the component is included in the drag.

5. The controller of claim 1, wherein the at least one parameter comprises a drag and the code is executable to control the processing unit to determine the setting for the yaw of the aerial vehicle by causing the processing unit to:
   determine a desired maneuver of the aerial vehicle;
   determine if there is a selected component in the drag based on the drag and the desired maneuver; and,
   determine the setting for the yaw of the aerial vehicle based on the drag and the determination of whether the selected component is in the drag.

6. The controller of claim 5, wherein the code is executable to control the processing unit to determine the setting for the yaw of the aerial vehicle based on the drag and the determination of whether the selected component is in the drag by controlling the processing unit to determine the setting for the yaw of the aerial vehicle parallel to the drag if the selected component is not in the drag.

7. The controller of claim 5, wherein the code is executable to control the processing unit to determine the setting for the yaw of the aerial vehicle based on the drag and the determination of whether the selected component is in the drag by controlling the processing unit to determine the setting for the yaw of the aerial vehicle perpendicular to a forward path of the aerial vehicle if the selected component is in the drag.

8. The controller of claim 1, wherein the code is executable to control the processing unit to determine the at least one parameter by causing the processing unit to:
   determine a deviation of the aerial vehicle from the path;
   determine a velocity of the aerial vehicle as the controller controls the plurality of rotary motors to propel the aerial vehicle to move in a direction along a path; and,
   determine a drag on the aerial vehicle based on the deviation and the velocity.

9. The controller of claim 1, the code is executable to control the processing unit to determine the at least one parameter by causing the processing unit to:
   turn off a global positioning satellite (GPS) lock and determine a drift of the aerial vehicle;
   determine a velocity of the aerial vehicle as the controller controls the plurality of rotary motors to propel the aerial vehicle to move in a direction along a path; and,
   determine a drag on the aerial vehicle based on the drift and the velocity.

10. The controller of claim 1, wherein the code is executable to control the processing unit to determine the at least one parameter by causing the processing unit to:
    determine a wind direction and magnitude;
    determine a velocity of the aerial vehicle; as the controller controls the plurality of rotary motors to propel the aerial vehicle to move in a direction along a path and,
    determine a drag on the aerial vehicle based on the wind direction and magnitude, and the velocity.

11. An aerial vehicle comprising:
a plurality of rotary motors;
a processing unit providing control signals for the plurality of rotary motors; and memory including code, which when executed controls the processing unit to:
   determine at least one parameter associated with forces on the aerial vehicle as the processing unit controls the plurality of rotary motors to propel the aerial vehicle to move in a direction along a path;
   determine a setting for a yaw of the aerial vehicle based on the at least one parameter, wherein the yaw defines an angle between an axis running from a first portion to a second portion of the aerial vehicle and the direction of movement of the aerial vehicle along the path; and,
   set the yaw of the aerial vehicle based on the determined setting for the yaw, wherein the aerial vehicle is positioned according to the angle defined by the yaw, by controlling the relative speeds of each of the plurality of rotary motors as the plurality of rotary motors propel the aerial vehicle in the direction along the path,
wherein the setting of the yaw of the aerial vehicle is determined based on a force parameter such that air drag is used to advantageously assist moving the aerial vehicle along the path or inhibit moving the aerial vehicle along the path.

12. The aerial vehicle of claim 11, wherein the code is executable to control the processing unit to determine the at least, one parameter by causing the processing unit to:
   receive data measured in an external environment of the aerial vehicle; and,
   determine at least one parameter associated with forces on the aerial vehicle based on the data.

13. The aerial vehicle of claim 11, wherein at least one parameter comprises a drag and the code is executable to control the processing unit to determine die setting for the yaw of the aerial vehicle by causing the processing unit to:
   determine that the aerial vehicle is to move in the direction along the path; and,
   determine the setting for the yaw of the aerial vehicle to reduce the influence of the drag on the aerial vehicle while the processing unit controls the plurality of rotary motors to propel the aerial vehicle to move in the direction along the path.

14. The aerial vehicle of claim 11, wherein at least one parameter comprises a drag and the code is executable to control the processing unit to determine the setting for the yaw of the aerial vehicle by causing the processing unit to:
   determine that the aerial vehicle is to move in the direction along the path; and,
   determine a yaw setting for the aerial vehicle to exploit the influence of the drag on the aerial vehicle while the processing unit controls the plurality of rotary motors to propel the aerial vehicle to moves in the direction along the path.

15. The aerial vehicle of claim 11, wherein at least one parameter comprises a drag, the setting for the yaw comprises a first setting for the yaw, and the code is executable to control the processing unit to further cause the processing unit to:
   determine that the aerial vehicle is to decelerate; and,
   determine a second-setting for the yaw of the aerial vehicle to exploit the influence of the drag on the aerial vehicle while decelerating.

16. The aerial vehicle of claim 11, wherein at least one parameter comprises a drag, the setting for the yaw comprises a first setting for the yaw, and the code is executable to control the processing unit to further cause the processing unit to:
   determine that the aerial vehicle is to accelerate; and,
   determine a second setting for the yaw of the aerial vehicle to reduce the influence of the drag on the aerial vehicle while accelerating.

17. A computer readable medium comprising instructions stored thereon, that when executed on a processor perform the steps of:
   determining at least one parameter associated with forces on an aerial vehicle as the processor controls a plurality of rotary motors to propel the aerial vehicle to move in a direction along a path;
   determining a setting for a yaw of the aerial vehicle based on the at least one parameter, wherein the yaw defines an angle between an axis running from a first portion to a second portion of the aerial vehicle and the direction of movement of the aerial vehicle along the path; and
   initiating setting of the yaw of the aerial vehicle based on the determined setting for the yaw, wherein the aerial vehicle is positioned according to the angle defined by the yaw by controlling the relative speeds of each of the plurality of rotary motors as the plurality of rotary motors propel the aerial vehicle to move in the direction along the path,
wherein the setting of the yaw of the aerial vehicle is determined based on a force parameter such that air drag is used to advantageously assist moving the aerial vehicle along the path or inhibit moving the aerial vehicle along the path.

18. The computer readable medium of claim 17, wherein the at least one parameter comprises a drag and the instructions, when executed on the processor, further perform the steps of:
   determining that the aerial vehicle is to move in the direction along the path; and,
   determining the setting for the yaw of the aerial vehicle taking into account the influence of the drag on the aerial vehicle while the processor controls the plurality of rotary motors to propel the aerial vehicle to move in the direction along the path.

19. The computer readable medium of claim 17, wherein the at least one parameter comprises a drag, the setting for the yaw comprises a first setting for the yaw, and the instructions, when executed on the processor, further perform the steps of:
   determining that the aerial vehicle is to decelerate; and,
   determining a second setting for the yaw of the aerial vehicle taking into account the influence of the drag on the aerial vehicle while decelerating.

20. The computer readable medium of claim 17, wherein the instructions, when executed on the processor, further perform the steps of:
   receiving data measured in an external environment of the aerial vehicle; and,
   determining at least one parameter associated with forces on the aerial vehicle based on the data.

* * * * *